United States Patent

[11] 3,578,360

[72] Inventor Sol S. Eliot
 Chicago, Ill.
[21] Appl. No. 842,248
[22] Filed July 16, 1969
[45] Patented May 11, 1971
[73] Assignee Perfex Plastics, Inc.
 Chicago, Ill.

[54] A FITTING FOR A LINER PIPE FORMED OF POLYETHYLENE
 1 Claim, 4 Drawing Figs.
[52] U.S. Cl............................................. 285/55,
 285/256, 285/338
[51] Int. Cl............................................. F16l 9/14,
 F16l 33/20
[50] Field of Search............................................. 285/55,
 256, 338

[56] References Cited
 UNITED STATES PATENTS
| 2,329,281 | 9/1943 | MacWilliam et al. | 285/256X |
| 2,453,997 | 11/1948 | MacWilliam | 285/256 |
| 2,926,701 | 3/1960 | Campbell | 285/55X |
| 3,479,059 | 11/1969 | Taylor et al. | 285/55 |

FOREIGN PATENTS
| 1,396,459 | 3/1965 | France | 285/256 |
| 1,003,337 | 11/1951 | France | 285/256 |
| 1,092,737 | 11/1960 | Germany | 285/256 |
| 905,381 | 9/1962 | Great Britain | 285/256 |

Primary Examiner—Thomas F. Callaghan
Attorney—Edward C. Threedy

ABSTRACT: A fitting for a liner pipe formed of plastic material such as polyethylene, the fitting having an enlarged shoulder, a boss, and a stud with circumferentially extending spaced-apart steps or ribs insertable in the end of the liner pipe. The shoulder is circumferentially beveled at one edge. A pliable compression ring is forced and compressed against the adjacent walls of a pipe within which the liner pipe is arranged and the fitting, to provide an effective seal and connection between the fitting and the pipe. The liner pipe is inserted upon the stud within a sleeve press-fitted on the boss, the sleeve and liner pipe being crimped to engage between the steps to provide connection between the liner pipe and the stud.

Patented May 11, 1971
3,578,360
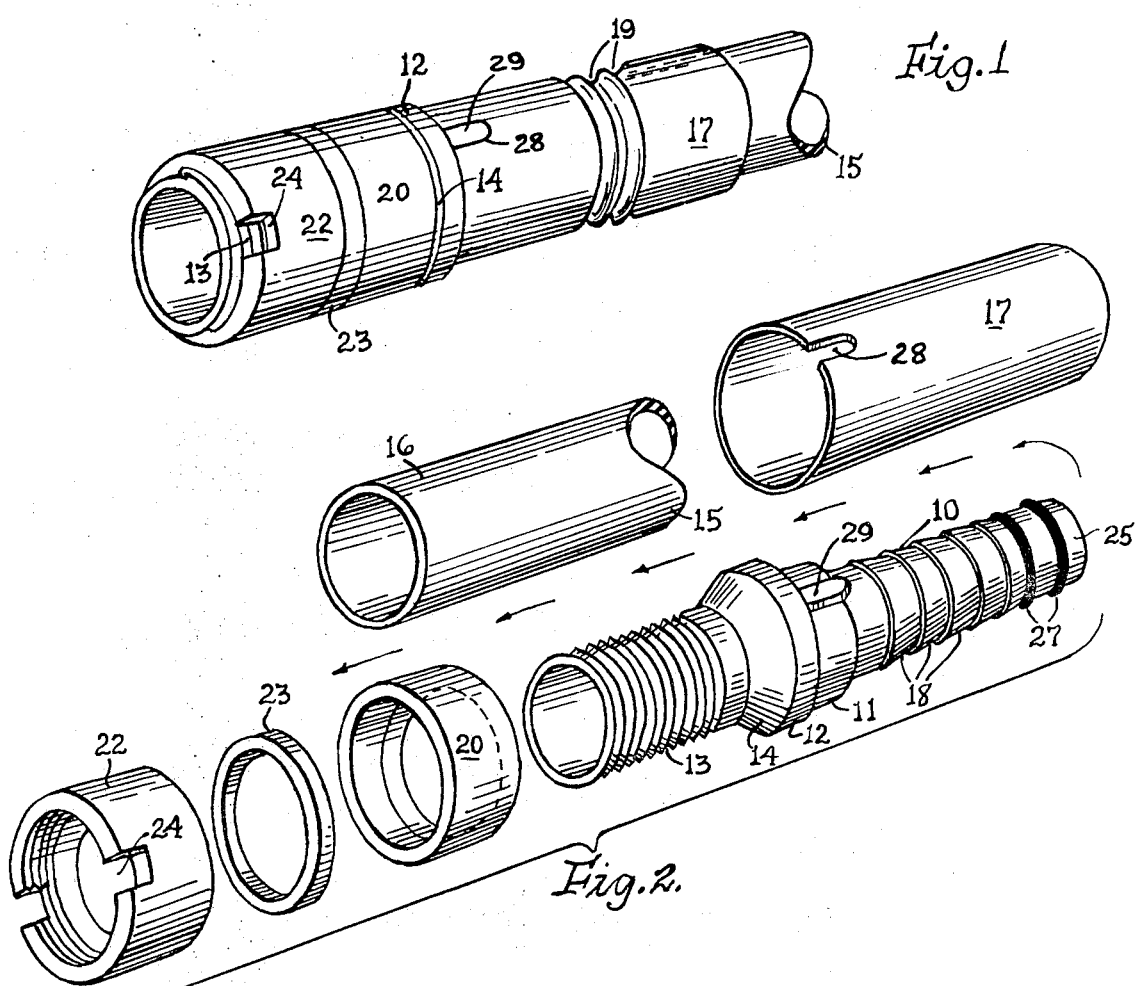
Fig.1
Fig.2
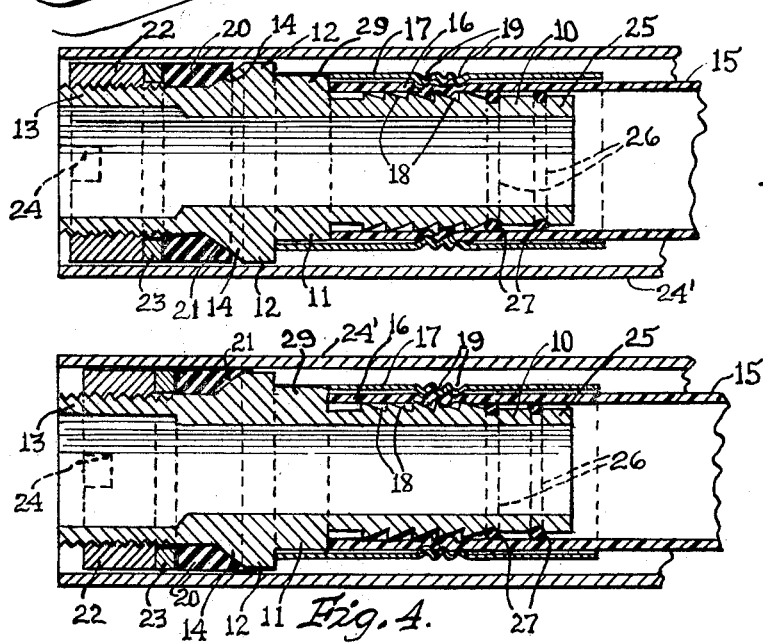
Fig.3.
Fig.4.
INVENTOR
SOL S. ELIOT
BY Edward C. Threedy
HIS ATTORNEY

A FITTING FOR A LINER PIPE FORMED OF POLYETHYLENE

SUMMARY OF THE INVENTION

In practice a liner pipe is one which is adapted to be telescopically arranged in an outer pipe for conveying therethrough gas or fluid from a source of supply. Normally the outer pipe is subjected to deterioration, such as a rusting or pitting. Such deterioration results in the formation of minute openings in the pipe through which the gas or fluid eventually escapes. Liner pipes presently employed are formed of metal and highly susceptible to this rusting or pitting process. I contemplate the use of a liner pipe formed of plastic material. To accomplish this I provide a fitting for sealing and connecting the liner pipe within the outer pipe. The preferred form of such fitting is shown in the accompanying drawings in which:

FIG. 1 is a fragmentary perspective view of a liner pipe having associated therewith my improved fitting;

FIG. 2 is a perspective view of the component parts of the invention shown in exploded relation;

FIG. 3 is a fragmentary, longitudinal, sectional detailed view of the invention prior to the sealing and connecting operation between the outer or cover pipe and the liner pipe;

FIG. 4 is a fragmentary, longitudinal, sectional detailed view similar to FIG. 3 but showing the parts in sealing and connected position.

My improved fitting, as shown in the drawings, includes an elongated cylindrical stud 10. This stud is formed as an integral part and extends laterally from a boss 11. The boss 11 is formed as an integral part and extends laterally from a shoulder 12. Extending from the shoulder 12 is a reduced threaded portion 13. The shoulder 12 has one edge circumferentially beveled as at 14. The liner pipe is indicated at 15 and is formed of noncorrosive material, such as, for example, polyethylene. The end portion 16 of the liner pipe 15 has inserted therein the stud 10. An elongated sleeve is indicated at 17. This sleeve 17 is force fitted upon the boss 11 and surrounds the end portion 16 of the liner pipe 15. The exterior surface of the stud 10 is provided with steps or ridges 18. When the end portion 16 of the liner pipe 15 is inserted upon the stud 10, the sleeve 17 and end 16 of the liner pipe 15 is crimped as at 19 to provide inwardly extended riblike elements which engage the adjacent steps or ridges 18 thereby to provide a firm and effective connection between the liner pipe 15 and the stud 10.

Mounted upon the threaded end portion 13 is a pliable ring 20 beveled at one end as at 21 to engage the beveled edge 14. Threaded upon the threaded end portion 13 is a compression nut 22. Between the ring 20 and the nut 22 is an intermediate ring 23. The threaded end portion 13 is provided with oppositely disposed notches 24 to receive a suitable tool whereby the nut 22 can be threaded upon the extension 13 in a direction to compress the ring 20 against the beveled edge 14 of the shoulder 12 thereby to force portions of the ring 20 between the shoulder 12 and a cover pipe 24' within which the liner pipe is arranged. This arrangement provides a firm and effective seal between the fitting and the cover pipe 24'.

The stud adjacent its end portion 25 is provided with adjacent grooves 26 into which are fitted O-rings 27 to provide a firm and effective seal between the stud 10 and the liner pipe 15.

To facilitate mounting the sleeve 17 upon the stepped cylindrical stud 10 during the crimping operation by preventing axial rotation between such parts, there is provided in the sleeve 17 extending inwardly from one edge thereof, a slot 28. This slot 28 will register with and receive an abutment 29 formed on the periphery of the boss 11 when the sleeve 17 is forced over the corresponding end portion 16 of the liner pipe 15 as shown.

From the foregoing description it will be apparent that I have provided a fitting for effectively connecting and sealing a liner pipe formed of plastic material, within a cover pipe.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. A fitting for a liner pipe formed of plastic material such as polyethylene, comprising a. a hollow fitting having an annular shoulder with one edge thereof beveled;

b. a boss extending from one side of said shoulder and of a diameter less than the diameter of said shoulder, and having an elongated abutment formed on the outer periphery thereof, c. an elongated stepped stud having a diameter less than and and extending coaxially from said boss and onto which one end portion of a liner pipe is mounted, d. a sleeve having a diameter less than the diameter of said shoulder and press-fitted on said boss and surrounding the end portion of the liner pipe which is mounted on said stud said sleeve having a slot extending inwardly from one edge thereof which cooperates with said abutment for preventing coaxial rotation of said sleeve relative to said boss and said stepped stud when the same is mounted thereon, e. means in the form of annular crimps cooperating with said stepped stud for connecting said sleeve and said liner pipe thereto, f. a thread-bearing portion extending from said shoulder from the side thereof opposite said boss, g. a pliable ring mounted on said thread-bearing portion and engaging said beveled edge, h. and a compression nut threaded on said threaded end portion to bear said ring again said beveled edge of said shoulder to compress a portion of said ring between said shoulder and a cover pipe within which the liner pipe is arranged.